United States Patent [19]

Cristante

[11] Patent Number: 4,619,116
[45] Date of Patent: Oct. 28, 1986

[54] APPARATUS FOR MAKING ICE CREAM

[75] Inventor: Guido Cristante, Omegna, Italy

[73] Assignee: I.P.E. Nuova Bialetti S.p.A. Industria Prodotti Elettrodomestici, Crusinallo di Omegna, Italy

[21] Appl. No.: 598,371

[22] Filed: Apr. 9, 1984

[30] Foreign Application Priority Data

Apr. 13, 1983 [IT] Italy .................. 20559 A/83

[51] Int. Cl.⁴ .............................................. A23G 9/00
[52] U.S. Cl. ....................... 62/233; 62/343; 62/342; 426/565; 426/524; 366/144; 366/309; 366/312
[58] Field of Search ............ 62/342, 343, 233; 259/DIG. 34; 366/309, 144, 312; 426/565–567, 524

[56] References Cited

U.S. PATENT DOCUMENTS

| 3,465,540 | 9/1969 | Carpigiani | 62/343 |
| 3,952,538 | 4/1976 | Warlick | 366/144 X |
| 4,392,361 | 7/1983 | Cavalli | 366/309 |
| 4,450,692 | 5/1984 | Sharpe et al. | 62/342 |

Primary Examiner—Jeanette Hunter
Attorney, Agent, or Firm—Karl F. Ross; Herbert Dubno

[57] ABSTRACT

A flavored liquid mixture to be converted into ice cream is prepared at ambient temperature and is then frozen for an indefinite period. When needed, the frozen mixture is placed in a vessel for vigorous agitation, again at ambient temperature, by a stirrer with two or more blades disposed at different levels and angularly offset from one another. The top and bottom blades are inclined toward each other in order to roll the mass over for thorough homogenization; in an initial stage, designed primarily for the breakup of ice crystals, the stirrer may be operated at a higher speed or in a pulsating mode.

2 Claims, 3 Drawing Figures

APPARATUS FOR MAKING ICE CREAM

FIELD OF THE INVENTION

My present invention relates to an apparatus, e.g. one designed as a household appliance, for making ice cream.

BACKGROUND OF THE INVENTION

The customary way of making ice cream involves the premixing of the requisite ingredients into a suitably flavored liquid composition which is then gradually frozen with continuous stirring to form a homogeneous, pasty mass. A household appliance operating according to this technique is then the subject matter of my copending application Ser. No. 577,152 filed Feb. 6, 1984 (see U.S. Pat. No. 4,551,026 of Nov. 5, 1985).

Even in the improved appliance described in that application, the need for refrigerating the mixture during agitation is still somewhat of an inconvenience. Thus, the appliance could be greatly simplified if the cooling of the mixture could be carried out in an ordinary icebox or refrigerator, apart from the other process steps.

OBJECTS OF THE INVENTION

An important object of my present invention, accordingly, is to provide an apparatus for making ice cream enabling such a separation between the freezing and agitating steps.

SUMMARY OF THE INVENTION

I have found, in accordance with the present invention, that the first-stated object can be realized by freezing the liquid mixture initially prepared at ambient temperature, for an indefinite storage period, and at some convenient time thereafter placing the frozen mixture in a treatment vessel in which it is vigorously agitated, again at ambient temperature, to break up ice crystals contained therein and transform the mixture into a homogeneous pasty mass. These ice crystals are formed by the water in the mixture whose fatty and sugary constituents do not crystallize.

According to a more particular feature of my invention, the agitation is performed with the aid of a stirrer which rotates about a vertical axis and carries two or more generally horizontal blades disposed at different levels and angularly offset from one another. An uppermost blade and a lowermost blade are inclined (transversely curved or pitched) toward each other in order to roll the mass repeatedly over in the treatment vessel.

Especially when the stirrer has more than two blades, a uniform rotary speed throughout the agitation and homogenization period may be satisfactory. I prefer, however, to divide that period into a more intense first phase, serving for the breakup of ice crystals, and a less intense second phase for uniformization. Thus, the stirrer may be rotated at higher speed in the first phase than in the second phase; alternatively, the stirrer may be rotated in a pulsating or intermittent mode in the first phase and in a continuous mode in the second phase.

The treatment vessel and its stirrer may be combined with a mixing vessel or blender in a household appliance generally similar to that disclosed in my copending application Ser. No. 577,152 (see U.S. Pat. No. 4,551,026 of Nov. 5, 1985) referred to above.

BRIEF DESCRIPTION OF THE DRAWING

The above and other features of my invention will now be described in detail with reference to the accompanying drawing in which.

SPECIFIC DESCRIPTION

Figure 2:
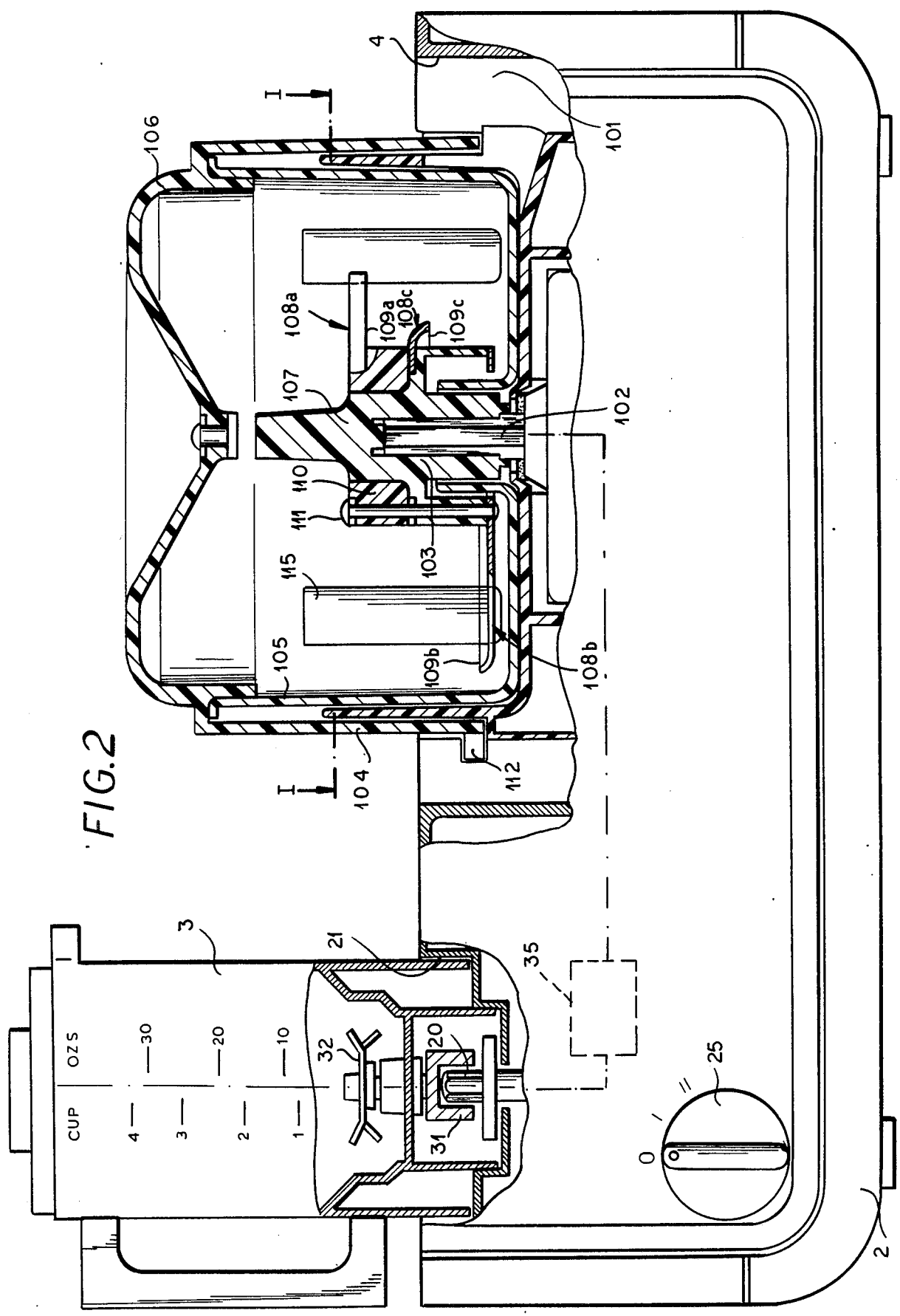
FIG. 2 is an elevational view, partly in section on the line II—II of FIG. 1, of an apparatus for carrying out that process.

Reference will first be made to FIG. 2 which shows a household-type ice-cream maker generally similar to that disclosed in my copending application Ser. No. 577,152 (see U.S. Pat. No. 4,551,026 of Nov. 5) but lacking a refrigeration unit. The appliance comprises a housing 2 whose top plate is formed with two cylindrical recesses 4 and 21, the first recess 4 having a split liner 101 accommodating a treatment vessel 105 more fully described hereinafter. The second recess 21, shallower than the first and of smaller diameter, serves as a seat for a removable blender 3. A drive motor 35, illustrated schematically, is coupled with a shaft 20 engaging a hub 31 of an agitator 32 within blender 3 when that blender is seated in this recess.

Figure 1:
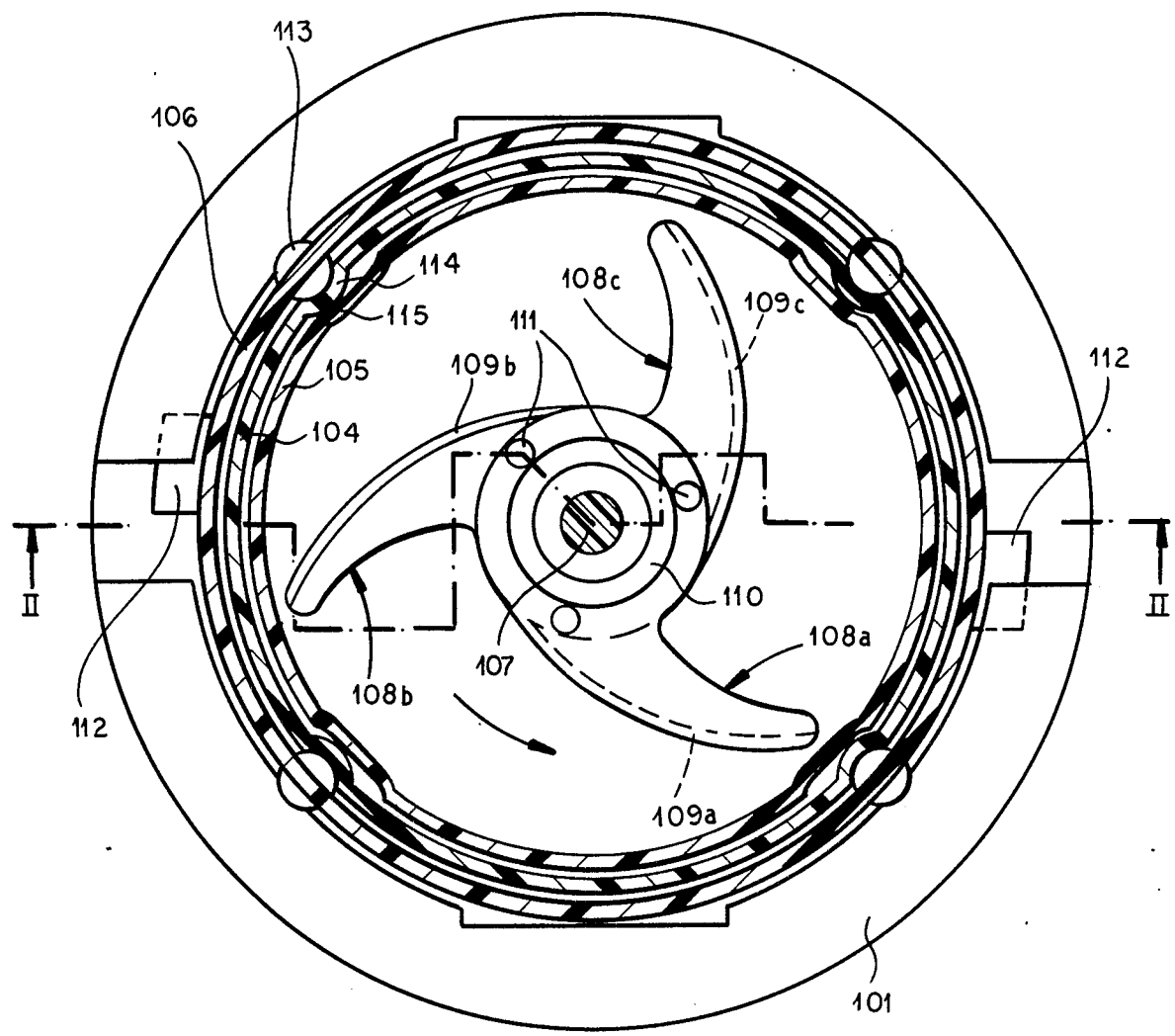
FIG. 1 is a top view, in section along line I—I of FIG. 2, of a treatment vessel and stirrer designed to perform the agitating step in my improved process.

Motor 35 also drives a hexagonal shaft 102 rising centrally within recess 4 to support a hub 107 of a stirrer provided with three angularly equispaced, generally horizontal blades 108a, 108b, 108c rotating counterclockwise as viewed in FIG. 1. The uppermost blade 108a is mounted by bolts 111 on a ring 110 surrounding the upper part of hub 107, the lowermost blade 108b being secured by the same bolts to the underside of that hub; the middle blade 108c is clamped between ring 110 and a shoulder of hub 107. Top blade 108a and middle blade 108c have downwardly curved trailing edges 109a, 109c (although edge 109c could be inverted) so as to sweep the surrounding mass downward; bottom blade 108b has an upturned trailing edge 109b tending to drive the mass upward whereby the same is rolled over repeatedly as the stirrer rotates.

Vessel 105 is seated in a shell 104 which is rotationally immobilized with reference to liner 101 by locators 113 and to the vessel by peripheral bulges 114, 115. A removable cover 106 is secured, during operation, to liner 101 by bayonet lugs 112.

Also shown in FIG. 2 is a knob 25 which is manually settable for the control of a potentiometer in the energizing circuit of motor 35 in order to vary its operating speed. One setting of knob 25 may be used (with blender 3 removed) to turn the shaft 102 of stirrer 107, 108a–108c pulsatingly or intermittently, as noted above, during an initial phase of operation.

To make ice cream, a mixture previously prepared in blender 3 and stored in a freezing compartment of a refrigerator—e.g. in prismatic or hemispherical molds—is introduced in its frozen state into vessel 105 whereupon the stirrer is set in operation for a suitable length of time. The pasty mass so produced is ready for serving.

Figure 3:
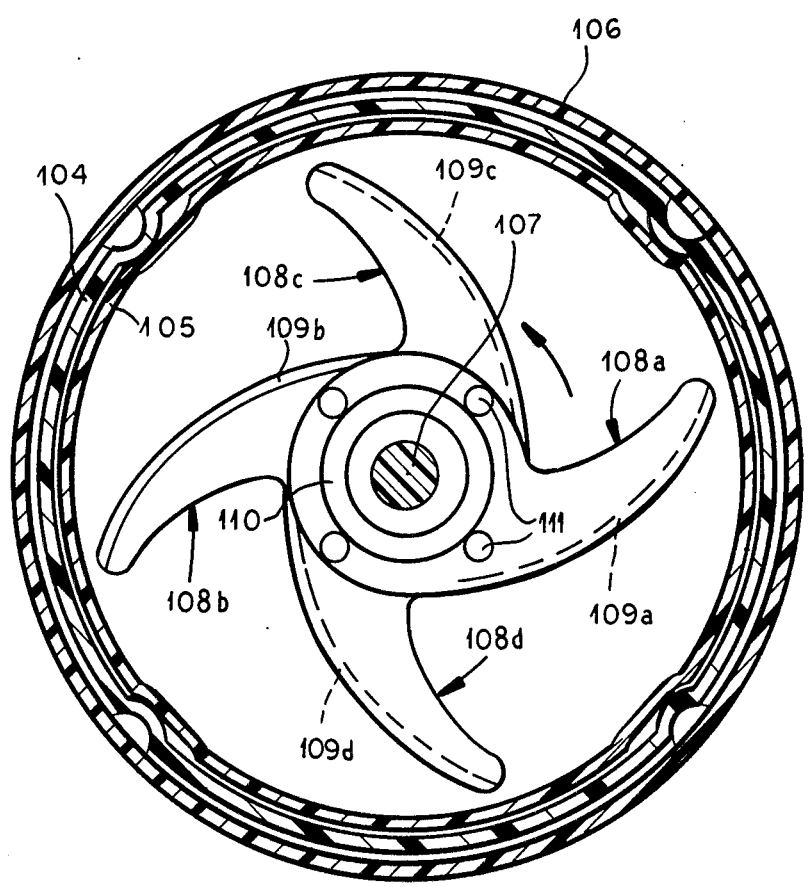
FIG. 3 is a view similar to FIG. 1, illustrating a modification.

In FIG. 3 I have shown a modified stirrer with four equispaced blades 108a, 108b, 108c, 108d, the added blade 108d being clamped adjacent blade 108c at almost the same level and having a downturned trailing edge 109d (which could be inverted to face upward). The operation is the same as that of the stirrer of FIGS. 1 and 2.

I claim:

1. An apparatus for making ice cream comprising:
   a housing formed with an upper surface and provided with a pair of spaced-apart upwardly open generally cylindrical recesses;
   respective shafts journaled in said housing and coaxial with said recesses;
   means forming a blender received in one of said recesses and including a blender container adapted to receive an ice cream mixture, and a blender blade engageable on the shaft of said one of said recesses for rotation thereby;
   a treatment vessel in the other of said recesses for receiving said mixture following preparation thereof in said blender for subjecting same to stirring to transform the mixture into ice cream;
   a stirrer in said vessel engaged on said shaft of said other recess and including at least three blades in a substantially
   equispaced relationship including an outwardly and forwardly curved upper blade extending in a sense of rotation of said stirrer and formed with a downwardly turned trailing edge,
   an outwardly and forwardly curved lower blade extending in said sense of rotation and having an upwardly turned trailing edge, and an outwardly and forwardly curved intermediate blade between said upper and lower blades and formed with a trailing edge extending from a plane of said intermediate blade;
   a variable speed motor in said housing operatively connected to said shafts; and
   control means on said housing operatively connected to said motor for operating at least said stirrer at a plurality of different speeds in successive phases of transformation of said mixture into ice cream.

2. The apparatus defined in claim 1 wherein a further intermediate blade is provided on said stirrer and is curved outwardly and forwardly in said sense of rotation while having a trailing edge projecting from a plane of said further intermediate blade, said intermediate blades lying substantially diametrically opposite one another along a diameter orthogonal to a diameter along which said upper and lower blades lie diametrically opposite one another.

* * * * *